United States Patent
Shemer et al.

(10) Patent No.: US 12,204,923 B2
(45) Date of Patent: Jan. 21, 2025

(54) DATA CENTER RESTORATION

(71) Applicant: EMC IP Holding Company LLC, Hopkinton, MA (US)

(72) Inventors: Jehuda Shemer, Kfar Saba (IL); Valerie Lotosh, Ramat-Gan (IL); Erez Sharvit, Ramat-Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 532 days.

(21) Appl. No.: 17/507,656

(22) Filed: Oct. 21, 2021

(65) Prior Publication Data

US 2023/0125085 A1     Apr. 27, 2023

(51) Int. Cl.
G06F 9/455     (2018.01)

(52) U.S. Cl.
CPC .. G06F 9/45558 (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,966,475 B2 * | 2/2015 | Srinivasan | G06F 9/4856 718/1 |
| 11,875,191 B1 | 1/2024 | Plenderleith et al. | |
| 2003/0028729 A1 | 2/2003 | Yamamoto et al. | |
| 2003/0126327 A1 | 7/2003 | Pesola et al. | |
| 2005/0193245 A1 | 9/2005 | Hayden et al. | |
| 2009/0172816 A1 | 7/2009 | Maino et al. | |
| 2010/0049823 A1 | 2/2010 | Saigo et al. | |
| 2012/0192006 A1 | 7/2012 | Qi et al. | |
| 2014/0215272 A1 | 7/2014 | Bauer et al. | |
| 2015/0074447 A1 | 3/2015 | Park et al. | |
| 2015/0169417 A1 | 6/2015 | Brandwine et al. | |
| 2015/0331753 A1 | 11/2015 | Nakajima et al. | |

(Continued)

OTHER PUBLICATIONS

Notice of Allowance mailed Feb. 8, 2024 for U.S. Appl. No. 17/507,661, 46 pages.

(Continued)

*Primary Examiner* — Eric C Wai
(74) *Attorney, Agent, or Firm* — Amin, Turocy & Watson, LLP

(57) ABSTRACT

A system can determine to restore a datacenter that comprises a group of virtualized workloads. The system can determine respective associations between respective virtualized workloads and respective datastores. The system can determine to restore a first virtualized workload of the group of virtualized workloads first. The system can restore a first portion of infrastructure that corresponds to the first virtualized workload first among a group of infrastructure. The system can, after restoring the first portion of infrastructure, restore a first portion of data that corresponds to the first virtualized workload first among a group of data. The system can, after restoring the first portion of data, restore a first portion of a virtualization layer that corresponds to the first virtualized workload first among a group of virtualization layers. The system can, after restoring the first portion of the virtualization layer, restore the first virtualized workload.

20 Claims, 11 Drawing Sheets

(56) References Cited

U.S. PATENT DOCUMENTS

| | | |
|---|---|---|
| 2015/0347221 A1 | 12/2015 | Anderson et al. |
| 2016/0062858 A1 | 3/2016 | Gallagher et al. |
| 2016/0119202 A1 | 4/2016 | Iyer et al. |
| 2017/0242758 A1* | 8/2017 | Chou ................. G06F 11/0793 |
| 2018/0365117 A1 | 12/2018 | Basham et al. |
| 2019/0163763 A1* | 5/2019 | Pandey ................ G06F 11/301 |
| 2019/0243725 A1 | 8/2019 | Bade et al. |
| 2020/0409803 A1 | 12/2020 | Naidu et al. |
| 2021/0281642 A1 | 9/2021 | Padiyar et al. |
| 2021/0342237 A1 | 11/2021 | Polimera et al. |
| 2022/0229685 A1 | 7/2022 | Helvey et al. |
| 2023/0127061 A1 | 4/2023 | Shemer et al. |
| 2023/0128370 A1 | 4/2023 | Shemer et al. |
| 2023/0130897 A1 | 4/2023 | Shemer et al. |

OTHER PUBLICATIONS

Office Action mailed Aug. 3, 2023 for U.S. Appl. No. 17/507,661, 52 pages.
Office Action mailed Sep. 27, 2024 for U.S. Appl. No. 17/507,664, 47 pages.
Office Action mailed Dec. 4, 2024 for U.S. Appl. No. 17/507,672, 37 pages.

* cited by examiner

800

(802)

DETERMINING RESPECTIVE ASSOCIATIONS BETWEEN RESPECTIVE VIRTUALIZED WORKLOADS OF A GROUP OF VIRTUALIZED WORKLOADS AND RESPECTIVE DATASTORES OF A GROUP OF COMPUTERS, WHEREIN THE GROUP OF VIRTUALIZED WORKLOADS OPERATES ON THE GROUP OF COMPUTERS 804

DETERMINING AN ORDERING FOR RESTORING RESPECTIVE VIRTUALIZED WORKLOADS OF THE GROUP OF VIRTUALIZED WORKLOADS 806

PERFORMING A ROLLING RESTORATION OF INFRASTRUCTURE, DATA, A VIRTUALIZATION LAYER, AND THE GROUP OF VIRTUALIZED WORKLOADS BASED ON THE ORDERING 808

DATA CENTER RESTORATION

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to restore a datacenter that comprises a group of virtualized workloads that operate on a group of computers. The system can determine respective associations between respective virtualized workloads of the group of virtualized workloads and respective datastores of the group of computers. The system can determine to restore a first virtualized workload of the group of virtualized workloads first among the group of virtualized workloads. The system can determine a first portion of infrastructure that corresponds to the first virtualized workload first among a group of infrastructure. The system can, after restoring the first portion of infrastructure, and while restoring a remainder of the group of infrastructure, restore a first portion of data that corresponds to the first virtualized workload first among a group of data. The system can, after restoring the first portion of data, and while restoring a remainder of the group of data, restore a first portion of a virtualization layer that corresponds to the first virtualized workload first among a group of virtualization layers. The system can, after restoring the first portion of the virtualization layer, and while restoring a remainder of the group of virtualization layers, restore the first virtualized workload.

An example method can comprise, in response to determining to restore a datacenter that comprises a group of virtualized workloads that operate on a group of computers, determining, by a system comprising a processor, respective associations between respective virtualized workloads of the group of virtualized workloads and respective datastores of the group of computers. The method can further comprise determining, by the system, an ordering for restoring respective virtualized workloads of the group of virtualized workloads. The method can further comprise restoring, by the system, a first portion of infrastructure that corresponds to the ordering. The method can further comprise, after restoring the first portion of infrastructure, and while restoring a remainder of the infrastructure, restoring, by the system, a first portion of data first among a group of data based on the ordering. The method can further comprise, after restoring the first portion of data, and while restoring a remainder of the group of data, restoring, by the system, a first portion of a virtualization layer first among a group of virtualization layers based on the ordering. The method can further comprise, after restoring the first portion of the virtualization layer, and while restoring a remainder of the group of virtualization layers, restoring, by the system, a first virtualized workload of the group of virtualized workloads based on the ordering.

An example non-transitory computer-readable medium can comprise instructions that, in response to execution, cause a system comprising a processor to perform operations. These operations can comprise determining respective associations between respective virtualized workloads of a group of virtualized workloads and respective datastores of a group of computers, wherein the group of virtualized workloads operates on the group of computers. The operations can further comprise determining an ordering for restoring respective virtualized workloads of the group of virtualized workloads. The operations can further comprise performing a rolling restoration of infrastructure, data, a virtualization layer, and the group of virtualized workloads based on the ordering.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow that can facilitate data center restoration, in accordance with an embodiment of this disclosure;

DETAILED DESCRIPTION

Example Architectures

Figure 1:
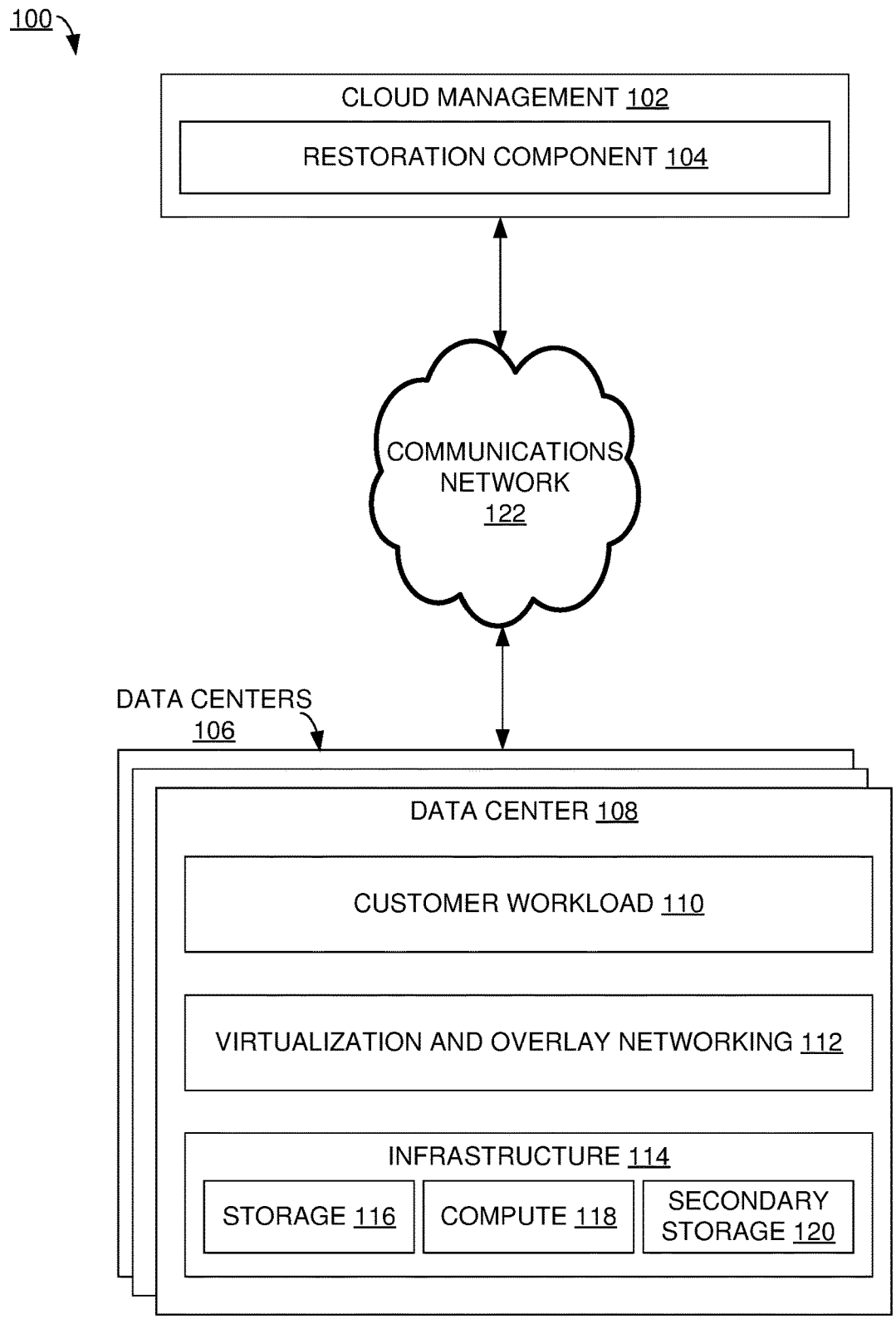
FIG. 1 illustrates an example system architecture that can facilitate data center restoration, in accordance with an embodiment of this disclosure.

FIG. 1 illustrates an example system architecture 100 that can facilitate data center restoration, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises restoration component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 120.

Figure 11:
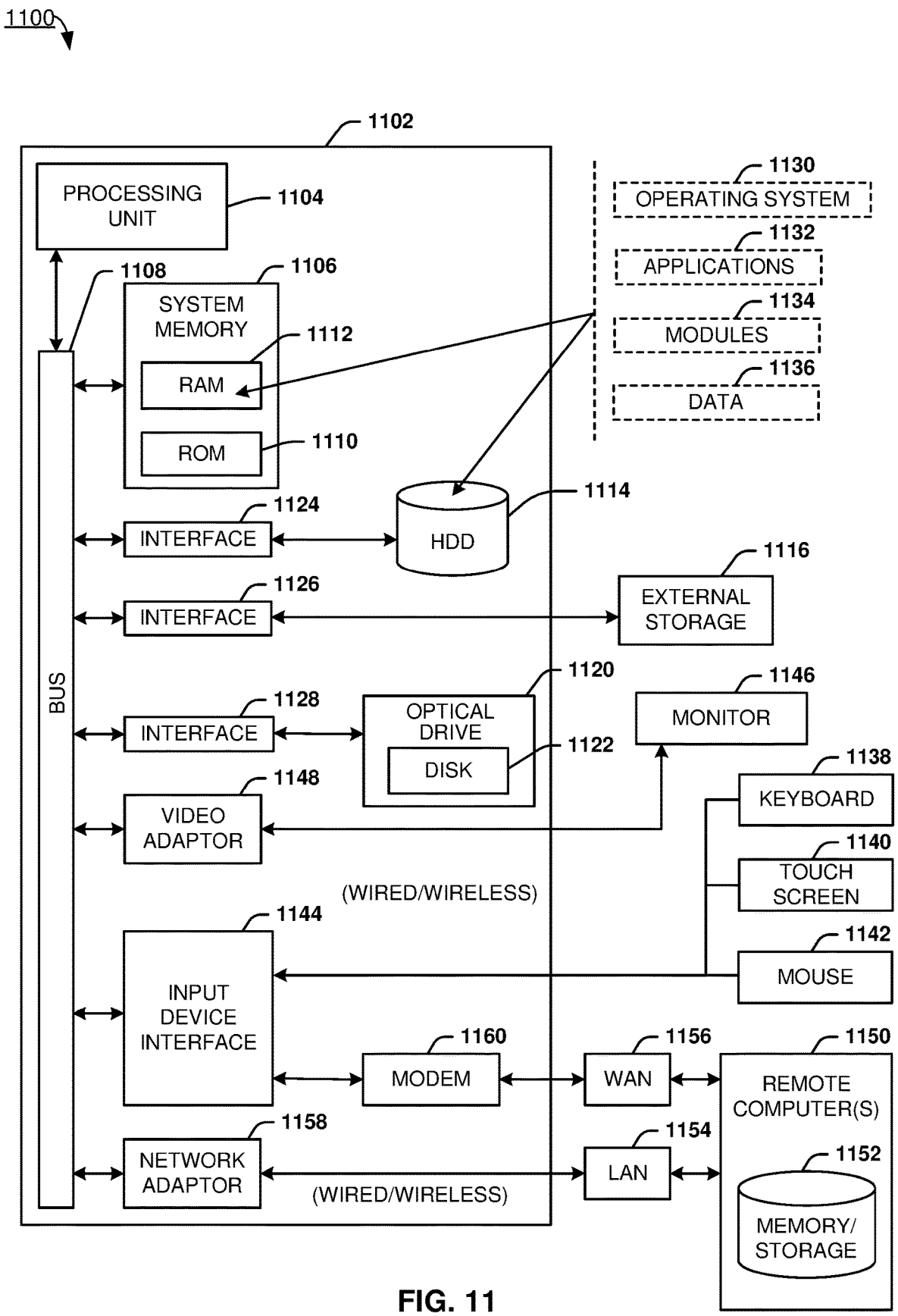
FIG. 11 illustrates an example block diagram of a computer operable to execute an embodiment of this disclosure.

Each of cloud management 102, data centers 106, and data center 108 can be implemented with part(s) of computing environment 1100 of FIG. 11. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Restoration component 104 of cloud management 102 can manage data centers 106 and data center 108 by managing a restoration of a data center. Restoring a data center can comprise using information about the data center (e.g., how virtualization and overlay networking is set up) and a backup of data of the data center to re-setup that data center (e.g., after the data center has lost power) or to restore the information of that data center to another data center (e.g., another data center of data centers 106). In effectuating data center restoration, restoration component 104 can implement part(s) of the operating procedures of FIGS. 6-10.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
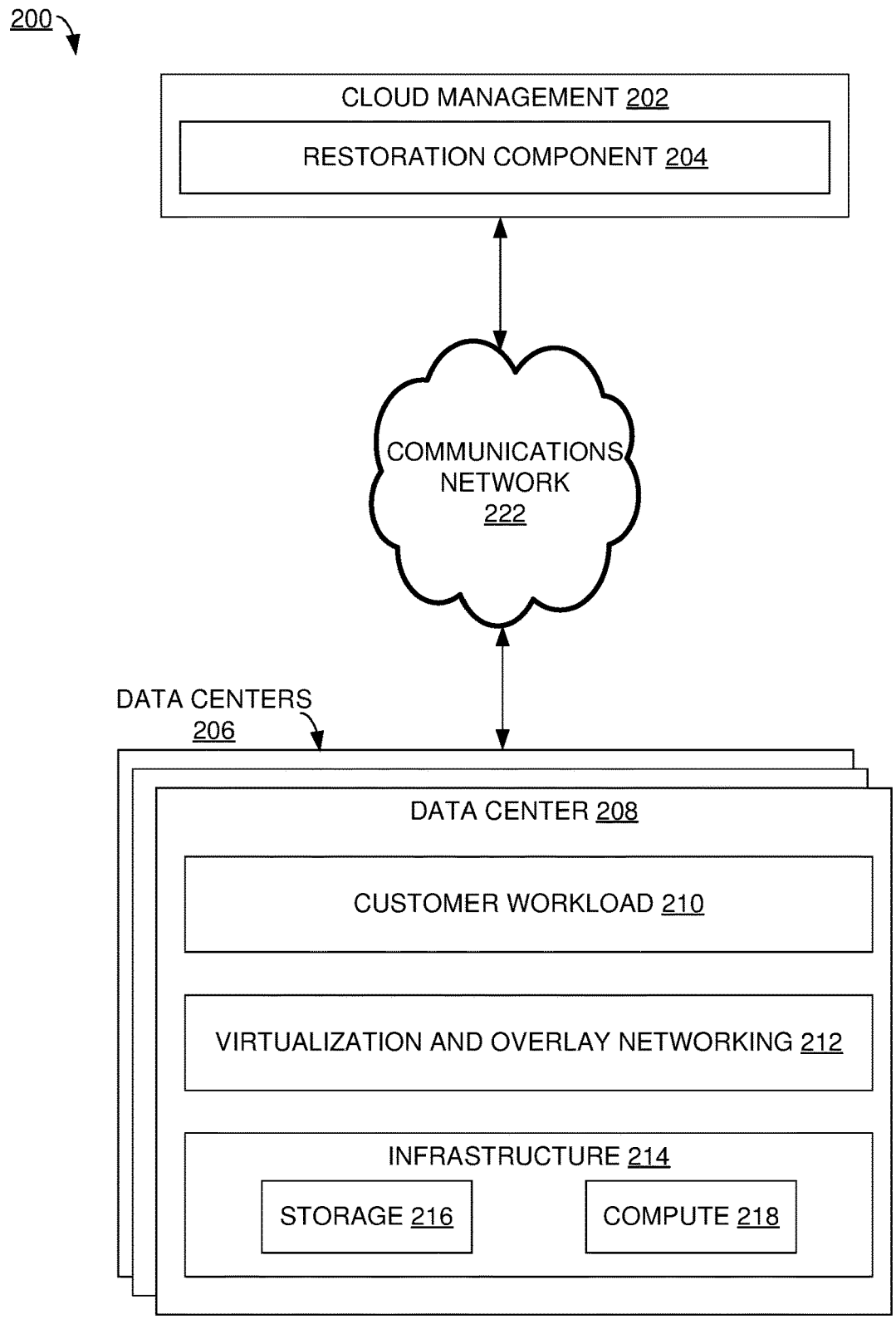
FIG. 2 illustrates another example system architecture that can facilitate data center restoration, in accordance with an embodiment of this disclosure.

FIG. 2 illustrates another example system architecture 200 that can facilitate data center restoration, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises restoration component 204 (which can be similar to restoration component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
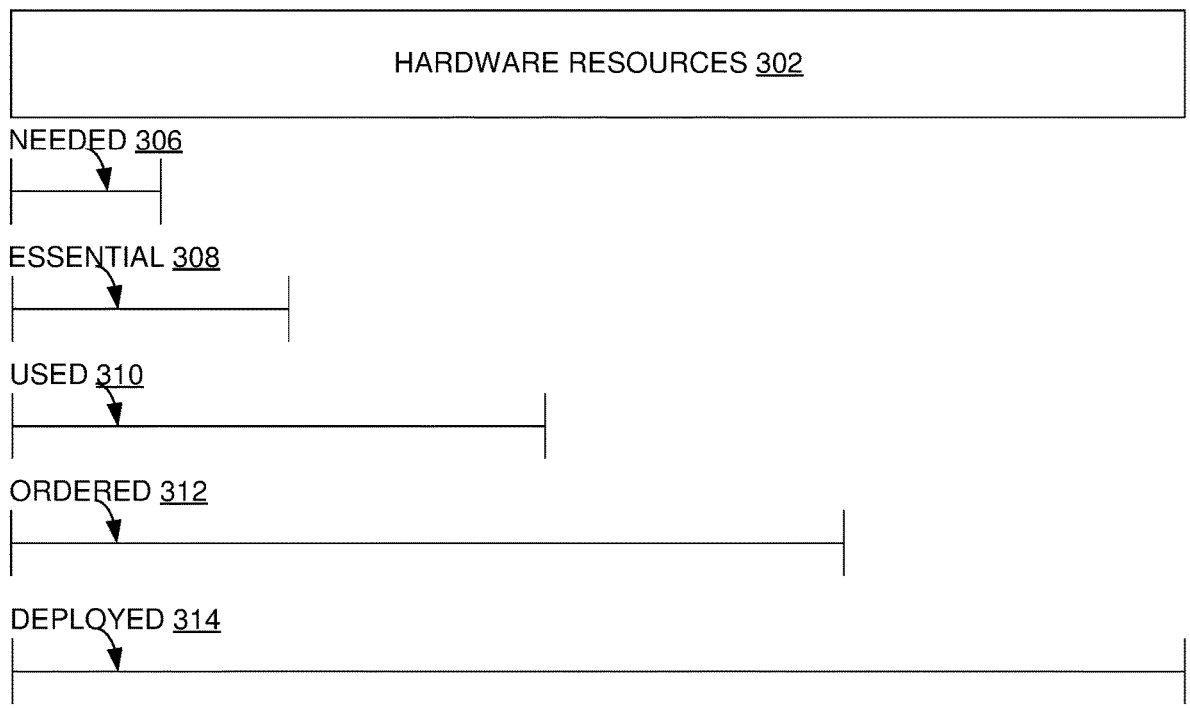
FIG. 3 illustrates an example system architecture that classifies deployed hardware resources, and that can facilitate data center restoration, in accordance with an embodiment of this disclosure.

FIG. 3 illustrates an example system architecture 300 that classifies deployed hardware resources, and that can facilitate data center restoration, in accordance with an embodiment of this disclosure. System architecture 300 comprises hardware resources 302 and restoration component 304. Restoration component 304 can be similar to restoration component 104 of FIG. 1 or restoration component 204 of FIG. 2. Hardware resources 302 can be similar to storage 116 of FIG. 1 or storage 216 of FIG. 2.

A given amount of hardware resources (e.g., measured in terabytes of data that can be stored) can be deployed at a data center (e.g., data center 108 of FIG. 1 or data center 208 of FIG. 2). It can be that the amount of hardware resources exceeds an amount ordered by the customer (e.g., so that if a disk fails, another disk can be activated so that the customer still has the amount of hardware resources it ordered). Of the ordered resources, it can be that the customer is not using all of those resources to store data. This information can be maintained by restoration component 304 and used to perform data center restoration in a manner that expedites restoration.

Hardware resources 302 can be logically divided into that which is needed 306, essential 308, used 310, ordered 312, and deployed 314.

A customer can have ordered a specific resource allocation from cloud management 102 (e.g., ordered 312). As part of delivery policy, a higher amount than ordered can be provided to give room for growth (e.g., deployed 314). When the customer uses resources of hardware resources 302, it might use only part of the ordered resources (e.g., used 310). In addition, due to load dispersion, fragmentation and management reasons, the resources actually required to meet the customer's storage requests can be less than that which is used (e.g., needed 306). Then, essential 308 can refer to a minimum amount of services that a customer deems needed to restore basic operations. What part of hardware resources 302 is essential 308 can be marked by a customer or derived by cloud management 102 of FIG. 1.

In some examples, to support restore operations, the minimum hardware necessary at a restore location is an amount corresponding to needed 306. This can mean that cloud management 102 can avoid waiting for the full hardware to be deployed and configured before data recovery is started, or even workloads are run. Thus, restore time can be reduced by determining what hardware is to be reconfigured before starting a next layer of a restore process.

System architecture 300 uses an example of one storage system. In a data center (e.g., data center 108 of FIG. 1), there can be several storage systems, multiple secondary storage systems, multiple servers, and other resources. Additionally, it can be that storage systems take a long time to provision and restore, and restoring storage systems is performed at a volume level.

Figure 4:
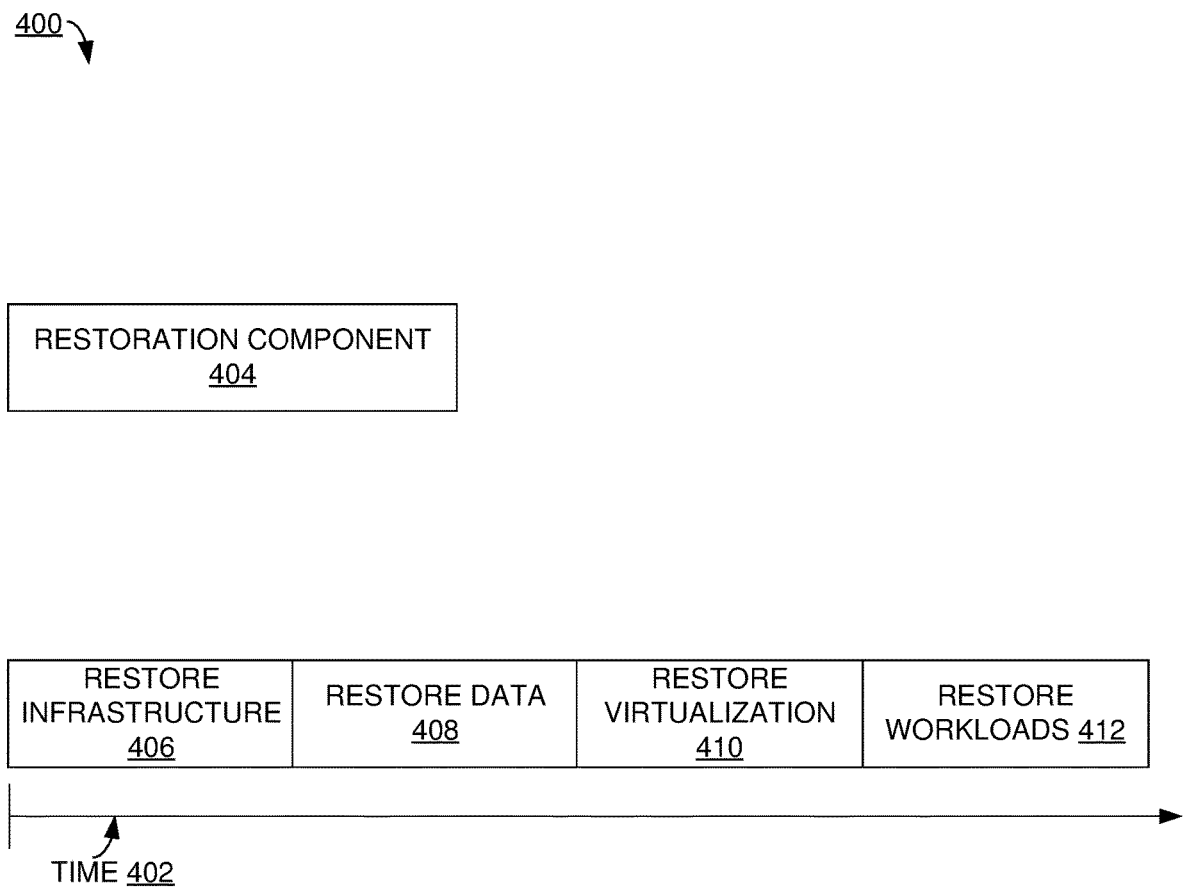
FIG. 4 illustrates an example system architecture for restoring a data center, and that can facilitate data center restoration, in accordance with an embodiment of this disclosure.

FIG. 4 illustrates an example system architecture 400 for restoring a data center, and that can facilitate data center restoration, in accordance with an embodiment of this disclosure. System architecture 400 comprises time 402 and restoration component 404. Restoration component 404 can be similar to restoration component 104 of FIG. 1, or restoration component 204 of FIG. 2. Time 402 can indicate a timeline that organizes when certain restore operations are performed by restoration component 404.

Restoration component 404 can perform restoration operations sequentially—e.g., restoration component 404 can restore one entire layer of a data center before moving onto another layer of the data center. As depicted, restoration component 404 performs restore infrastructure 406 in its entirety, then performs restore data 408 in its entirety, then performs restore virtualization 410 in its entirety, and then performs restore workloads 412.

Figure 5:
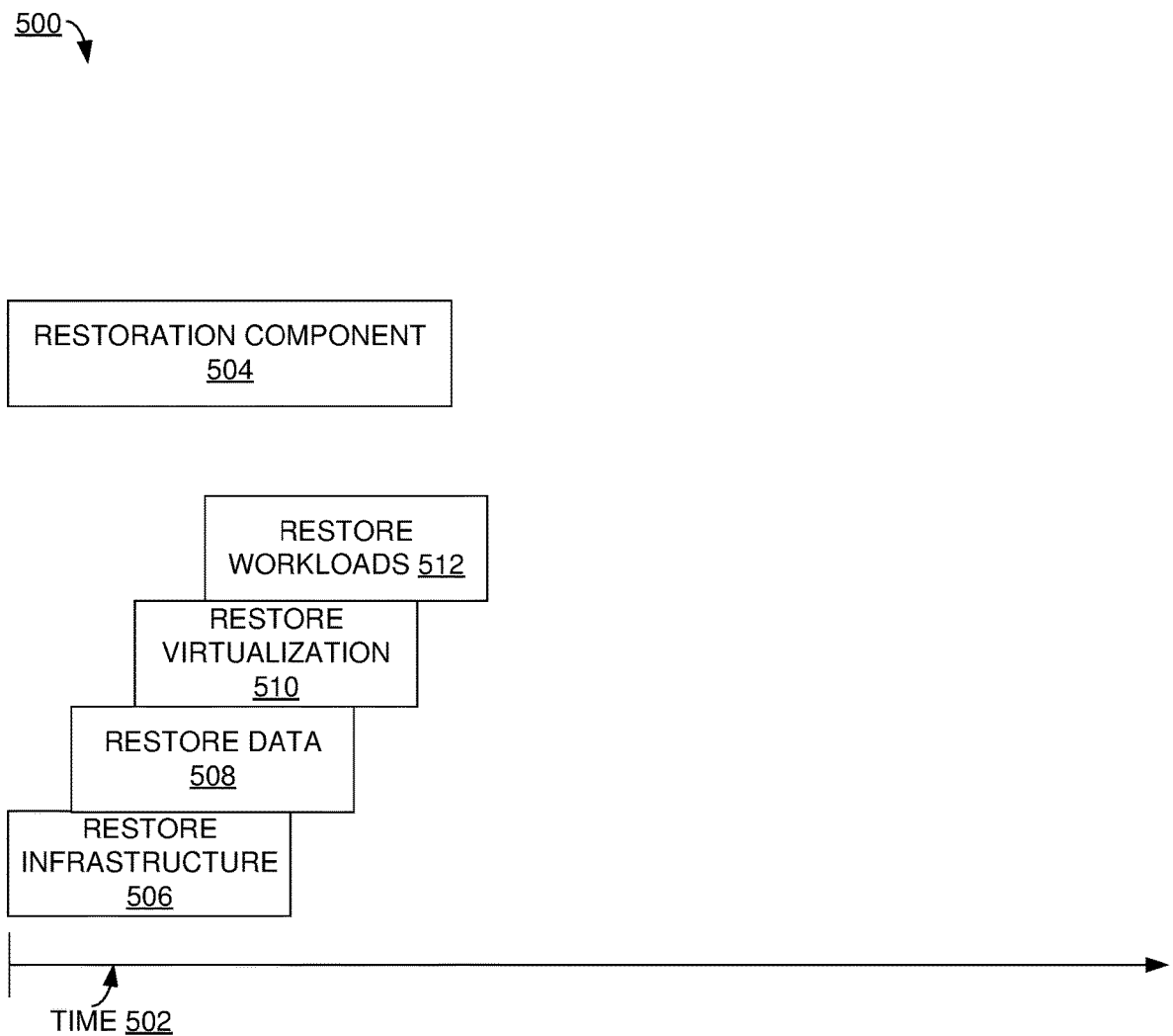
FIG. 5 illustrates another example system architecture for restoring a data center, and that can facilitate data center restoration, in accordance with an embodiment of this disclosure.

This sequential restoration approach taken in system architecture 400 can be viewed in contrast to a rolling restoration approach taken in system architecture 500 of FIG. 5.

FIG. 5 illustrates another example system architecture 500 for restoring a data center, and that can facilitate data center restoration, in accordance with an embodiment of this disclosure. In contrast to the sequential restoration of system architecture 400 of FIG. 4, system architecture 500 can involve a rolling restoration, which can lead to customer workloads being executed more quickly.

System architecture 500 comprises time 502 and restoration component 504. Restoration component 504 can be similar to restoration component 104 of FIG. 1, or restoration component 204 of FIG. 2. Time 502 can indicate a timeline that organizes when certain restore operations are performed by restoration component 504.

As depicted, restoration component 504 can perform an amount of restore infrastructure 506 sufficient to start performing restore data 508 (while continuing to perform restore infrastructure 506 in parallel with performing restore data 508). How much infrastructure is sufficient to begin restoring data can be determined based on determining associations between virtual entities and corresponding physical resources as described with respect to operation 606 of FIG. 6. Based on determining these associations, what resources a virtual entity needs to run (e.g. how much compute, storage, etc. a virtual machine needs to run) can be determined. Once enough of these resources have been restored, the virtual entity can be restored (e.g., restoration of a virtual machine can be triggered).

Similarly, restoration component 504 can perform an amount of performing restore data 508 sufficient to start performing restore virtualization 510 (while continuing to perform restore data 508 in parallel with performing restore virtualization 510). Likewise, restoration component 504 can perform an amount of restore virtualization 510 sufficient to start performing restore workloads 512 (while continuing to perform restore virtualization 510 in parallel with performing restore workloads 512). A result of this rolling approach to restoration of system architecture 500 is that there can be a shorter time between starting a restoration and workloads executing compared to the sequential approach to restoration of system architecture 400 of FIG. 4.

Example Process Flows

Figure 6:
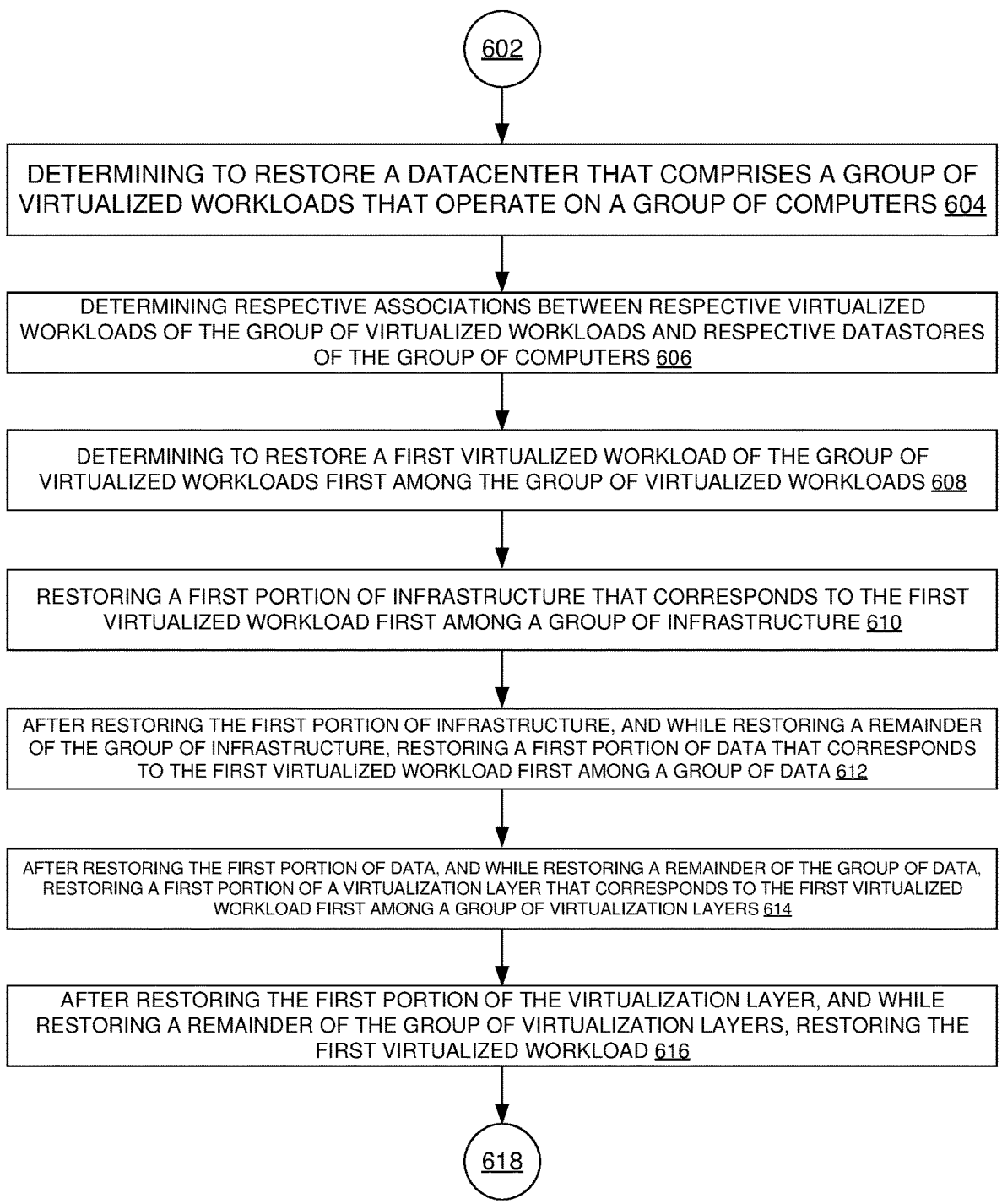
FIG. 6 illustrates an example process flow that can facilitate data center restoration, in accordance with an embodiment of this disclosure.

FIG. 6 illustrates an example process flow that can facilitate data center restoration, in accordance with an embodiment of this disclosure. In some examples, one or more embodiments of process flow 600 can be implemented by restoration component 104 of FIG. 1, restoration component 204 of FIG. 2, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts determining to restore a datacenter that comprises a group of virtualized workloads that operate on a group of computers. After operation 604, process flow 600 moves to operation 606.

Operation 606 depicts determining respective associations between respective virtualized workloads of the group of virtualized workloads and respective datastores of the group of computers. That is, virtual-to-physical connections can be determined. In some examples, operation 606 can be implemented in a similar manner as with process flow 1000 of FIG. 10.

In some examples, operation 606 comprises determining respective associations between respective virtualized workloads of the group of virtualized workloads and respective disk volumes of the group of computers. In some examples, operation 606 comprises determining respective associations between respective virtualized workloads of the group of virtualized workloads and respective namespaces of the group of computers. In some examples, operation 606 comprises determining respective associations between respective virtualized workloads of the group of virtualized workloads and respective groupings of the group of computers. In some examples, operation 606 comprises determining respective associations between respective virtualized workloads of the group of virtualized workloads and respective clusterings of the group of computers.

In some examples, a virtualization management component maintains an inventory of the virtual entities it manages, and their respective configuration. For example, a virtualization management component that manages virtual machines can maintain information on virtual machines and virtual machine configurations (e.g., CPUs, memory, a list of virtual storage devices sometimes referred to as virtual machine disks (VMDKs), etc.); a list of compute hosts (e.g., hypervisors); a list of data stores, which can be disks allocated from a primary storage that VMDKs can be stored on, and that can be identified with an ID that is provided by the primary storage; a relationship between a virtual machine and a hypervisor (e.g., virtual machine X is running on hypervisor Y); a relationship between a datastore and a hypervisor (e.g., datastore D is mounted on hypervisor X, hypervisor Y, and hypervisor Z); and/or a relationship between a virtual storage device and a data store (e.g., VMDK X is on datastore D).

Give a virtual machine, a command can be issued to a virtualization management component to list that virtual machine's VMDKs, and from that relationship and knowing the VMDKs, a command can be issued to list the corresponding datastores.

Other information can be derived. For example, it can be determined on what hypervisor a particular virtual machine is running (that hypervisor can need to have mounted on it all datastores that contain the VMDKs that the virtual machine is connected to). Therefore physical information (e.g., disk IDs) can be determined from virtual information and metadata, and similarly, a placement of virtual entities due to physical constraints can be determined as well. Similar techniques can be applied to determine associations between virtual entities and physical networking, compute load, affinity and constraints, grouping, and more.

After operation 606, process flow 600 moves to operation 608.

Operation 608 depicts determining to restore a first virtualized workload of the group of virtualized workloads first among the group of virtualized workloads. This priority can correspond to a determination of which workloads are most important to resume execution of during a restore.

After operation 608, process flow 600 moves to operation 610.

Operation 610 depicts restoring a first portion of infrastructure that corresponds to the first virtualized workload first among a group of infrastructure. This portion of infrastructure can be an amount of infrastructure determined to be needed to be restored to be able to start restoring data on top of the infrastructure. In some examples, operations 610-616 can be implemented in a similar manner as is depicted with system architecture 500 of FIG. 5.

After operation 610, process flow 600 moves to operation 612.

Operation 612 depicts, after restoring the first portion of infrastructure, and while restoring a remainder of the group of infrastructure, restoring a first portion of data that corresponds to the first virtualized workload first among a group of data. That is, data restoration can begin during infrastructure restoration. This portion of data being restored can be an amount of data determined to be needed to be restored to be able to start restoring the virtualization layer with the data.

After operation 612, process flow 600 moves to operation 614.

Operation 614 depicts, after restoring the first portion of data, and while restoring a remainder of the group of data, restoring a first portion of a virtualization layer that corresponds to the first virtualized workload first among a group of virtualization layers. That is, when enough of the virtualization layer is restored to run the first virtualized workload, then do so. This portion of the virtualization layer being restored can be an amount of the virtualization layer (e.g., a virtualization management component) determined to be needed to be restored to be able to start restoring the first virtualized workload. In some examples, infrastructure can continue to be restored while beginning to restore the virtualization layer.

After operation 614, process flow 600 moves to operation 616.

Operation 616 depicts, after restoring the first portion of the virtualization layer, and while restoring a remainder of the group of virtualization layers, restoring the first virtualized workload. In some examples, infrastructure and data can continue to be restored while beginning to restore the virtualization layer.

After operation 616, process flow 600 moves to 618, where process flow 600 ends.

Figure 7:
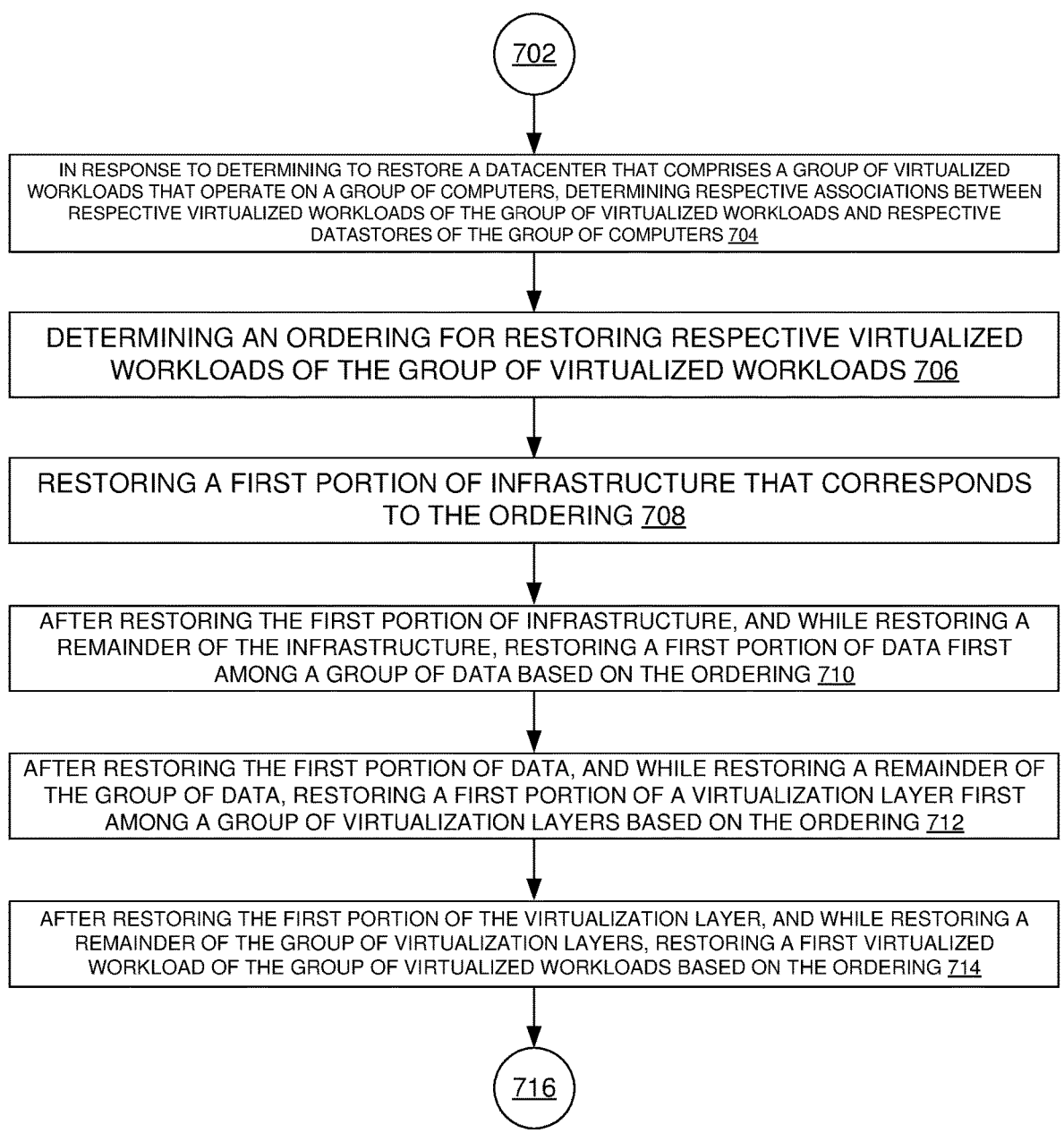
FIG. 7 illustrates another example process flow that can facilitate data center restoration, in accordance with an embodiment of this disclosure.

FIG. 7 illustrates another example process flow 700 that can facilitate data center restoration, in accordance with an embodiment of this disclosure. In some examples, one or more embodiments of process flow 700 can be implemented by restoration component 104 of FIG. 1, restoration component 204 of FIG. 2, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts, in response to determining to restore a datacenter that comprises a group of virtualized workloads that operate on a group of computers, determining respective associations between respective virtualized workloads of the group of virtualized workloads and respective datastores of the group of computers. In some examples, operation 704 can be implemented in a similar manner as operations 604-606 of FIG. 6.

After operation 704, process flow 700 moves to operation 706.

Operation 706 depicts determining an ordering for restoring respective virtualized workloads of the group of virtualized workloads. In some examples, operation 706 can be implemented in a similar manner as operation 608 of FIG. 6. In some examples, operation 706 comprises determining an order of virtual entities to restore that correspond to the group of virtualized workloads. In some examples, this can be implemented in a similar manner as process flow 900 of FIG. 9.

After operation 706, process flow 700 moves to operation 708.

Operation 708 depicts restoring a first portion of infrastructure that corresponds to the ordering.

After operation 708, process flow 700 moves to operation 710. In some examples, operation 708 can be implemented in a similar manner as operation 610 of FIG. 6.

After operation 708, process flow 700 moves to operation 710.

Operation 710 depicts, after restoring the first portion of infrastructure, and while restoring a remainder of the infrastructure, restoring a first portion of data first among a group of data based on the ordering. In some examples, operation 710 can be implemented in a similar manner as operation 612 of FIG. 6.

After operation 710, process flow 700 moves to operation 712.

Operation 712 depicts, after restoring the first portion of data, and while restoring a remainder of the group of data, restoring a first portion of a virtualization layer first among a group of virtualization layers based on the ordering. In some examples, operation 712 can be implemented in a similar manner as operation 614 of FIG. 6.

After operation 712, process flow 700 moves to operation 714.

Operation 714 depicts after restoring the first portion of the virtualization layer, and while restoring a remainder of the group of virtualization layers, restoring a first virtualized workload of the group of virtualized workloads based on the ordering. In some examples, operation 714 can be implemented in a similar manner as operation 616 of FIG. 6.

After operation 714, process flow 700 moves to 716, where process flow 700 ends.

FIG. 8 illustrates another example process flow that can facilitate data center restoration, in accordance with an embodiment of this disclosure. In some examples, one or more embodiments of process flow 800 can be implemented by restoration component 104 of FIG. 1, restoration component 204 of FIG. 2, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts determining respective associations between respective virtualized workloads of a group of virtualized workloads and respective datastores of a group of computers, wherein the group of virtualized workloads operates on the group of computers. In some examples, operation 804 can be implemented in a similar manner as operation 606 of FIG. 6.

After operation 804, process flow 800 moves to operation 806.

Operation 806 depicts determining an ordering for restoring respective virtualized workloads of the group of virtualized workloads. In some examples, operation 806 can be implemented in a similar manner as operation 608 of FIG. 6.

In some examples, operation 806 comprises determining to restore namespaces or clusters that correspond to the virtualized workloads based on receiving priority data from a user account. That is, restoring complete namespaces or clusters can be prioritized, with higher priority namespaces or clusters being restored before ones with a lower priority. Additionally, a user can specify the priority.

In some examples, operation 806 comprises determining to restore namespaces or clusters that correspond to the virtualized workloads based on an amount of traffic associated with respective namespaces or clusters of the namespaces or clusters, or based on a size of data associated with respective namespaces or clusters of the namespaces or clusters. That is, clusters or namespaces that process more network traffic or process more data can be assigned a higher priority.

In some examples, operation 806 comprises determining to restore namespaces or clusters that correspond to the virtualized workloads based on respective priorities, wherein a first namespace or cluster of the namespaces or clusters has a first priority, and determining a second priority of a second namespace or cluster of the namespaces or clusters based on determining that the second namespace or cluster is associated with the first namespace or cluster, and based on the first priority. The association can be an association, a dependency, a communication pattern, or a configuration. In some examples, if Component A has a high priority and depends on Component B, then Component B can have a high priority as a result of the dependency (so that high priority Component A is not unduly waiting on Component B to be restored).

In some examples, operation 806 comprises determining to restore namespaces or clusters that correspond to the virtualized workloads based on a number of elements associated with respective namespaces or clusters of the namespaces or clusters.

After operation 806, process flow 800 moves to operation 808.

Operation 808 depicts performing a rolling restoration of infrastructure, data, a virtualization layer, and the group of virtualized workloads based on the ordering. In some examples, operation 808 can be implemented in a similar manner as operations 610-616 of FIG. 6.

After operation 808, process flow 800 moves to 810, where process flow 800 ends.

Figure 9:
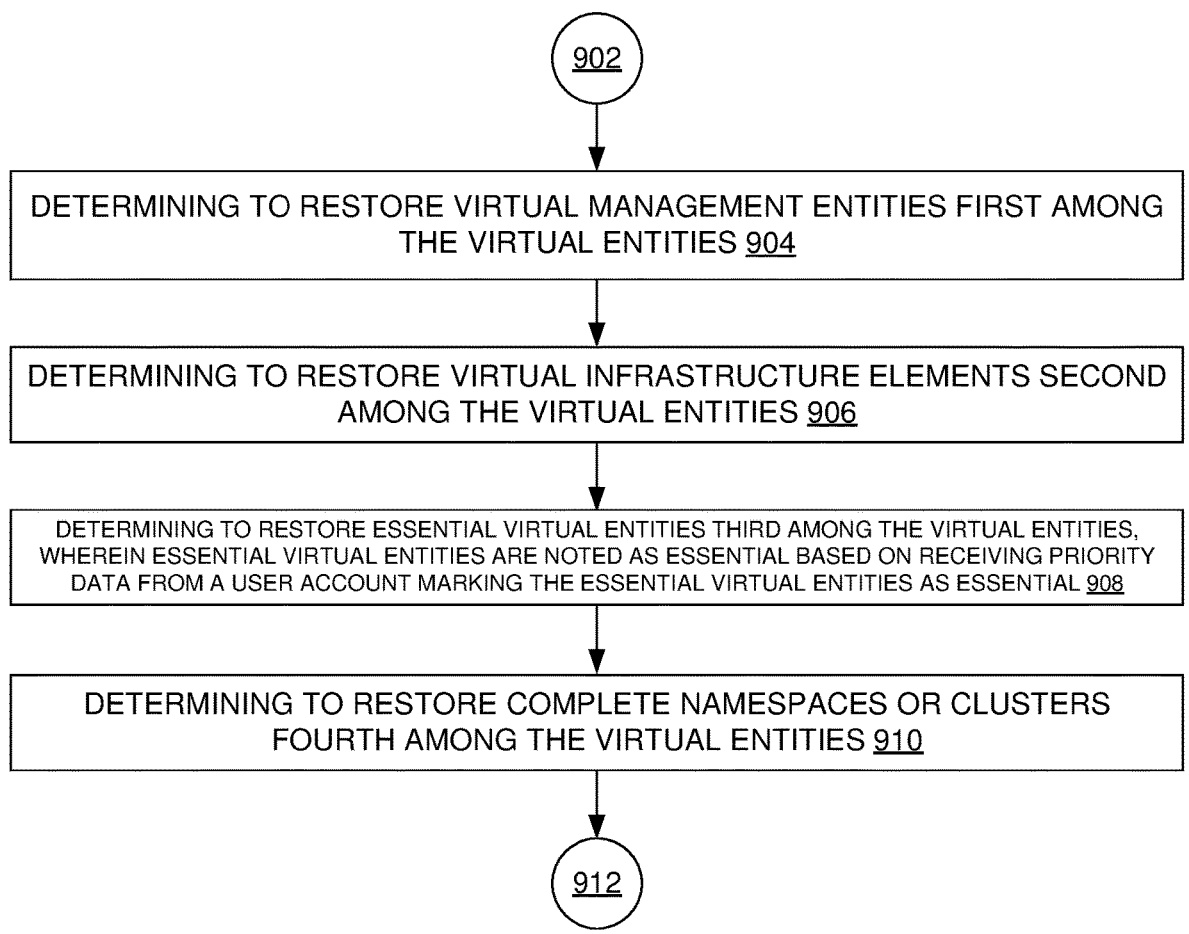
FIG. 9 illustrates an example process flow for restoring virtual entities, and that can facilitate data center restoration, in accordance with an embodiment of this disclosure.

FIG. 9 illustrates an example process flow for restoring virtual entities, and that can facilitate data center restoration, in accordance with an embodiment of this disclosure. In some examples, one or more embodiments of process flow 900 can be implemented by restoration component 104 of FIG. 1, restoration component 204 of FIG. 2, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 can be implemented to determine an order of virtual entities to restore. An order of virtual entities to restore can be determined so as to expedite restoring a datacenter to a point where customer workloads are being executed.

Process flow 900 begins with 902, and moves to operation 904. Operation 904 depicts determining to restore virtual management entities first among the virtual entities. In some examples, a first virtual management entity of the virtual management entities comprises a master node. In some examples, a first virtual management entity of the virtual management entities comprises a management component for virtual machines.

After operation 904, process flow 900 moves to operation 906.

Operation 906 depicts determining to restore virtual infrastructure elements second among the virtual entities. In some examples, a first virtual infrastructure element of the virtual infrastructure elements comprises at least one plugin, at least one security component, and/or at least one monitoring component.

After operation 906, process flow 900 moves to operation 908.

Operation 908 depicts determining to restore essential virtual entities third among the virtual entities, wherein essential virtual entities are noted as essential based on receiving priority data from a user account marking the essential virtual entities as essential.

After operation 908, process flow 900 moves to operation 910.

Operation 910 depicts determining to restore complete namespaces or clusters fourth among the virtual entities.

After operation 910, process flow 900 moves to 912, where process flow 900 ends.

Figure 10:
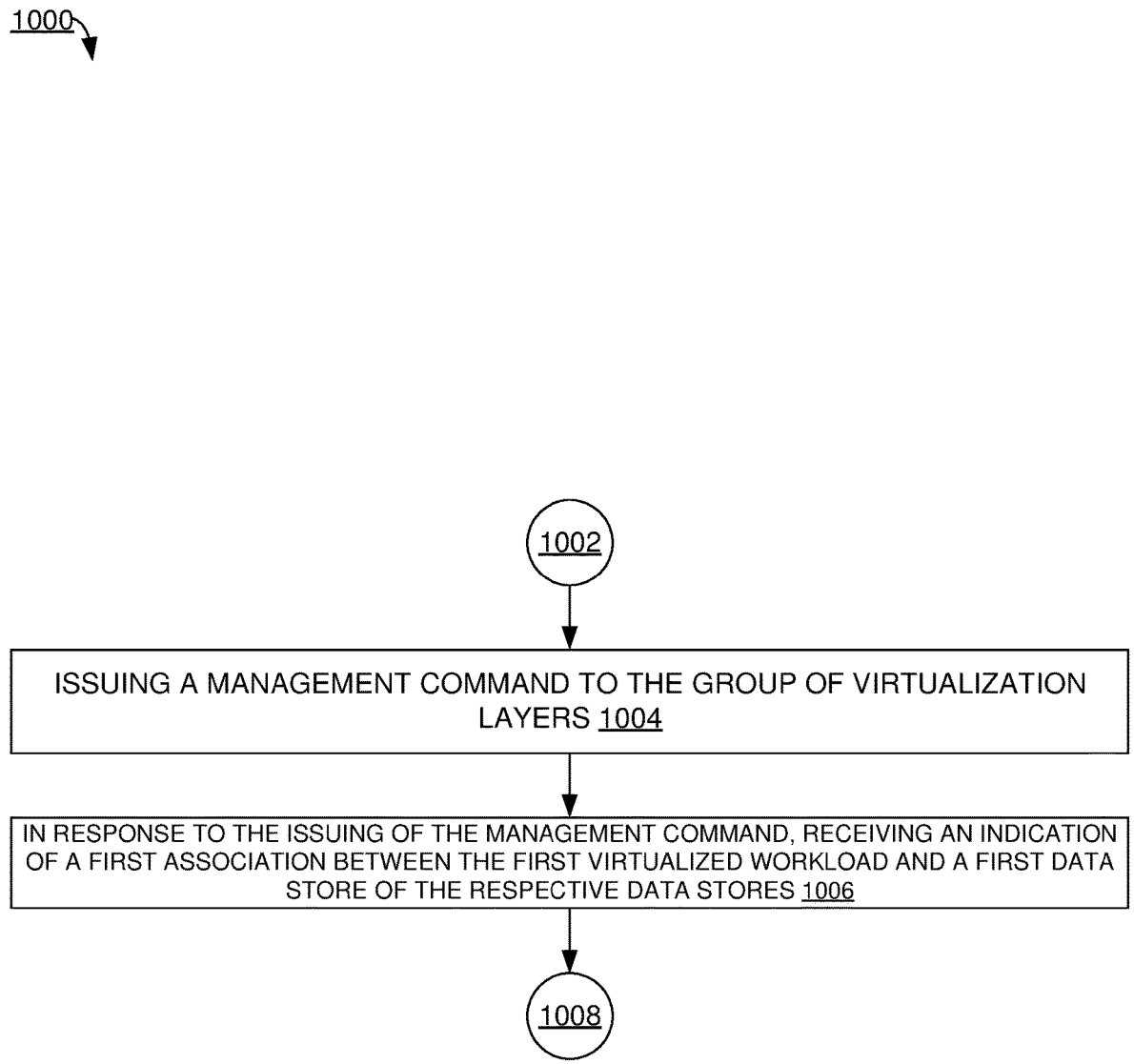
FIG. 10 illustrates an example process flow for determining an order of data to restore, and that can facilitate data center restoration, in accordance with an embodiment of this disclosure.

FIG. 10 illustrates an example process flow for determining an order of data to restore, and that can facilitate data center restoration, in accordance with an embodiment of this disclosure. In some examples, one or more embodiments of process flow 1000 can be implemented by restoration component 104 of FIG. 1, restoration component 204 of FIG. 2, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 can be implemented to identify a virtual to-physical connection in a data center that runs virtualized workloads.

Process flow 1000 begins with 1002, and moves to operation 1004. Operation 1004 depicts issuing a management command to the group of virtualization layers. This can comprise issuing one or more management commands can be made according to an application programming interface of a virtualization management component that is part of the group of virtualization layers.

After operation 1004, process flow 1000 moves to operation 1006.

Operation 1006 depicts, in response to the issuing of the management command, receiving an indication of a first association between the first virtualized workload and a first datastore of the respective datastores. That is, a virtualization management component can maintain associations between physical computer resources and their virtualized representations (e.g., a storage drive, or a network address). In response to operation 1004, the virtualization management component can provide this information.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of cloud management 102, data centers 106, and/or data center 108 of FIG. 1, and/or cloud management 202, data centers 206, and/or data center 208 of FIG. 2.

In some examples, computing environment 1100 can implement one or more embodiments of the process flows of FIGS. 6-10 to facilitate data center restoration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
at least one processor; and
at least one memory that stores executable instructions that, when executed by the at least one processor, facilitate performance of operations, comprising:
  determining to restore a datacenter that comprises a group of virtualized workloads that operate on a group of computers;
  determining respective associations between respective virtualized workloads of the group of virtualized workloads and respective datastores of the group of computers;
  determining to restore a first virtualized workload of the group of virtualized workloads first among the group of virtualized workloads;
  restoring a first portion of infrastructure that corresponds to the first virtualized workload first among a group of infrastructure;
  after restoring the first portion of infrastructure, and while restoring a remainder of the group of infrastructure, restoring a first portion of data that corresponds to the first virtualized workload first among a group of data;
  after restoring the first portion of data, and while restoring a remainder of the group of data, restoring a first portion of a virtualization layer that corre- sponds to the first virtualized workload first among a group of virtualization layers; and after restoring the first portion of the virtualization layer, and while restoring a remainder of the group of virtualization layers, restoring the first virtualized workload.

2. The system of claim 1, wherein the determining of respective associations between respective virtualized workloads of the group of virtualized workloads and respective datastores of the group of computers comprises:

issuing a management command to the group of virtualization layers; and in response to the issuing of the management command, receiving an indication of a first association between the first virtualized workload and a first datastore of the respective datastores.

3. The system of claim 1, wherein the determining of respective associations between respective virtualized workloads of the group of virtualized workloads and respective datastores of the group of computers comprises:

determining respective associations between respective virtualized workloads of the group of virtualized workloads and respective disk volumes of the group of computers.

4. The system of claim 1, wherein the determining of respective associations between respective virtualized workloads of the group of virtualized workloads and respective datastores of the group of computers comprises:

determining respective associations between respective virtualized workloads of the group of virtualized workloads and respective namespaces of the group of computers.

5. The system of claim 1, wherein the determining of respective associations between respective virtualized workloads of the group of virtualized workloads and respective datastores of the group of computers comprises:

determining respective associations between respective virtualized workloads of the group of virtualized workloads and respective groupings of the group of computers.

6. The system of claim 1, wherein the determining of respective associations between respective virtualized workloads of the group of virtualized workloads and respective datastores of the group of computers comprises:

determining respective associations between respective virtualized workloads of the group of virtualized workloads and respective clusterings of the group of computers.

7. A method, comprising:

in response to determining to restore a datacenter that comprises a group of virtualized workloads that operate on a group of computers, determining, by a system comprising at least one processor, respective associations between respective virtualized workloads of the group of virtualized workloads and respective datastores of the group of computers;

determining, by the system, an ordering for restoring respective virtualized workloads of the group of virtualized workloads;

restoring, by the system, a first portion of infrastructure that corresponds to the ordering;

after restoring the first portion of infrastructure, and while restoring a remainder of the infrastructure, restoring, by the system, a first portion of data first among a group of data based on the ordering;

after restoring the first portion of data, and while restoring a remainder of the group of data, restoring, by the system, a first portion of a virtualization layer first among a group of virtualization layers based on the ordering; and after restoring the first portion of the virtualization layer, and while restoring a remainder of the group of virtualization layers, restoring, by the system, a first virtualized workload of the group of virtualized workloads based on the ordering.

8. The method of claim 7, wherein the determining of the ordering comprises:

determining, by the system, an order of virtual entities to restore that correspond to the group of virtualized workloads.

9. The method of claim 8, wherein the determining of the order of virtual entities to restore comprises:

determining, by the system, to restore virtual management entities first among the virtual entities.

10. The method of claim 9, wherein a first virtual management entity comprises a master node.

11. The method of claim 9, wherein a first virtual management entity comprises a management component for virtual machines.

12. The method of claim 9, wherein the determining of the order of virtual entities to restore comprises:

determining to restore virtual infrastructure elements second among the virtual entities.

13. The method of claim 12, wherein a first virtual infrastructure element of the virtual infrastructure elements comprises at least one security component, or at least one monitoring component.

14. The method of claim 12, wherein the determining of the order of virtual entities to restore comprises:

determining to restore essential virtual entities third among the virtual entities, wherein essential virtual entities are noted as essential based on receiving priority data from a user account marking the essential virtual entities as essential.

15. The method of claim 14, wherein the determining of the order of virtual entities to restore comprises:

determining to restore complete namespaces or clusters fourth among the virtual entities.

16. A non-transitory computer-readable medium comprising instructions that, in response to execution, cause a system comprising at least one processor to perform operations, comprising:

determining respective associations between respective virtualized workloads of a group of virtualized workloads and respective datastores of a group of computers, wherein the group of virtualized workloads operates on the group of computers;

determining an ordering for restoring respective virtualized workloads of the group of virtualized workloads;

restoring a first portion of infrastructure that corresponds to the ordering;

after restoring the first portion of infrastructure, and while restoring a remainder of the infrastructure, restoring a first portion of data first among a group of data based on the ordering;

after restoring the first portion of data, and while restoring a remainder of the group of data, restoring a first portion of a virtualization layer first among a group of virtualization layers based on the ordering; and after restoring the first portion of the virtualization layer, and while restoring a remainder of the group of virtualization layers, restoring a first virtualized workload of the group of virtualized workloads based on the ordering.

17. The non-transitory computer-readable medium of claim 16, wherein the operations further comprise:
   determining to restore namespaces or clusters that correspond to the virtualized workloads based on receiving priority data from a user account.

18. The non-transitory computer-readable medium of claim 16, wherein the operations further comprise:
   determining to restore namespaces or clusters that correspond to the virtualized workloads based on an amount of traffic associated with respective namespaces or clusters of the namespaces or clusters, or based on a size of data associated with respective namespaces or clusters of the namespaces or clusters.

19. The non-transitory computer-readable medium of claim 16, wherein the operations further comprise:
   determining to restore namespaces or clusters that correspond to the virtualized workloads based on respective priorities, wherein a first namespace or cluster of the namespaces or clusters has a first priority; and
   determining a second priority of a second namespace or cluster of the namespaces or clusters based on determining that the second namespace or cluster is associated with the first namespace or cluster, and based on the first priority.

20. The non-transitory computer-readable medium of claim 16, wherein the operations further comprise:
   determining to restore namespaces or clusters that correspond to the virtualized workloads based on a number of elements associated with respective namespaces or clusters of the namespaces or clusters.

* * * * *